(12) United States Patent
Pursifull et al.

(10) Patent No.: US 10,240,545 B2
(45) Date of Patent: Mar. 26, 2019

(54) AIR CHARGE ESTIMATION VIA MANIFOLD PRESSURE SAMPLE AT INTAKE VALVE CLOSING

(71) Applicant: Ford Global Technologies, LLC, Dearborn, MI (US)

(72) Inventors: Ross Dykstra Pursifull, Dearborn, MI (US); Justin Trzeciak, Riverview, MI (US); Joseph Norman Ulrey, Dearborn, MI (US); Thomas G. Leone, Ypsilanti, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 419 days.

(21) Appl. No.: 14/977,150

(22) Filed: Dec. 21, 2015

(65) Prior Publication Data

US 2017/0175660 A1    Jun. 22, 2017

(51) Int. Cl.
*F02D 41/18* (2006.01)
*F02D 41/00* (2006.01)
*F02D 41/34* (2006.01)

(52) U.S. Cl.
CPC ....... *F02D 41/182* (2013.01); *F02D 41/0002* (2013.01); *F02D 41/009* (2013.01); *F02D 41/34* (2013.01); *F02D 2200/0402* (2013.01); *F02D 2200/0406* (2013.01); *F02D 2200/0408* (2013.01); *Y02T 10/44* (2013.01)

(58) Field of Classification Search
CPC ......... F02D 2200/0406; F02D 41/0002; F02D 41/182; F02D 41/34; F02D 41/009; F02D 2200/0408; F02D 2200/0402; Y02T 10/42; Y02T 10/44
See application file for complete search history.

(56) References Cited

U.S. PATENT DOCUMENTS

| | | |
|---|---|---|
| 5,505,180 A | 4/1996 | Otterman et al. |
| 6,088,647 A | 7/2000 | Hemberger et al. |
| 6,089,082 A | 7/2000 | Kotwicki et al. |
| 6,311,669 B1 | 11/2001 | Przymusinski et al. |
| 6,694,953 B2 | 2/2004 | Barnes et al. |
| 6,840,228 B2 | 1/2005 | Yomogida et al. |
| 6,850,831 B2 | 2/2005 | Buckland et al. |
| 6,851,304 B2 | 2/2005 | Cullen et al. |

(Continued)

FOREIGN PATENT DOCUMENTS

| | | |
|---|---|---|
| DE | 19946506 C1 | 7/2001 |
| DE | 19726757 B4 | 4/2005 |

OTHER PUBLICATIONS

Pursifull, Ross Dykstra et al., "Methods and Systems for Engine Fuel and Torque Control," U.S. Appl. No. 15/076,212, filed Mar. 21, 2016, 60 pages.

*Primary Examiner* — Sizo Vilakazi
(74) *Attorney, Agent, or Firm* — Julia Voutyras; McCoy Russell LLP (57) ABSTRACT

Methods and systems are provided for the estimation of an aircharge into a cylinder used to adjust an engine operating parameter, based on a manifold pressure signal stored in a buffer. In one example, a method may include sampling an intake manifold pressure sensor signal at even increments of time, stamping it with its corresponding crank angle and storing it in a buffer. The closest stored signal to the intake valve closing of a cylinder may be used to calculate its aircharge.

20 Claims, 4 Drawing Sheets

(56) References Cited

U.S. PATENT DOCUMENTS

| | | |
|---|---|---|
| 7,210,458 B2 | 5/2007 | Walther et al. |
| 7,343,809 B2 | 3/2008 | Baumann et al. |
| 8,352,153 B2 | 1/2013 | Gibson et al. |
| 2004/0255902 A1* | 12/2004 | Sawada ................ F02D 31/001 123/339.11 |
| 2005/0205057 A1* | 9/2005 | Yamashita ............ F02D 41/009 123/406.58 |
| 2013/0066535 A1 | 3/2013 | Leone et al. |
| 2016/0123247 A1* | 5/2016 | Mizoguchi ............ B60W 10/06 123/406.55 |

* cited by examiner

AIR CHARGE ESTIMATION VIA MANIFOLD PRESSURE SAMPLE AT INTAKE VALVE CLOSING

FIELD

The present disclosure relates to controlling airflow into a cylinder of an engine.

BACKGROUND AND SUMMARY

Determining an amount of air entering an engine, and in particular an amount of air in cylinders of the engine, is important for various aspects of engine control, including regulating emissions and fuel consumption. Due to airflow dynamics at the throttle versus the cylinders, aircharge is frequently estimated based on the manifold absolute pressure (MAP), which may be measured with a sensor. However, the MAP will continuously vary throughout the operation of the engine. U.S. Patent Application No. 2013/0066535 A1 describes a method for the determination of aircharge using a pressure sensor located between the air intake port of a cylinder and a port throttle, and a method comprising pressure measurements for each firing cycle in each cylinder at or near intake valve closing time. The referenced application determines the air pressure at intake valve closing (IVC), or at the closest instance possible. Thus measurement of the MAP at IVC results in accurate estimation of the air pressure within the cylinder.

However, the inventors herein have recognized an issue with the above approach. In order to sample the MAP sensor at IVC, an interrupt may be generated by the engine control unit (ECU) at IVC to trigger sampling and/or processing of the MAP sensor signal. Alternatively, the MAP sensor may be sampled at even increments of engine crank angle, and then the samples may be analyzed to determine which sample was taken at or close to IVC. Either method, however, is computationally expensive and may not be feasible with current ECU architectures. Further, such methods may lose accuracy and/or require even more computation resources during transient operation, e.g., when engine speed is increasing.

Accordingly, the inventors herein provide an approach to at least partly address the above issues. In one example, a method includes sampling an intake manifold pressure sensor signal at even increments of time, storing each sampled signal in a buffer, processing the stored sampled signals in the buffer at even increments of engine crank angle, and adjusting a fuel injection amount based on a selected one of the processed sampled signals.

In this way, an intake manifold pressure (MAP) sensor signal is sampled at even increments of time and each sampled signal is stored in a buffer. Each of these MAP sensor samples may be stamped with the corresponding angle of the crankshaft at time of sampling. Concomitantly, the presented commanded or actual position of IVC is also noted. When the aircharge is to be computed (e.g., once per firing period), the MAP sample with an angle stamp closest to IVC is retrieved from the buffer. This MAP signal may be used to compute aircharge for a particular cylinder. Once the aircharge of the cylinder is determined, the proper injection amount of fuel may be computed. The disclosed method overcomes the incapacity of existing ECUs to both sample and process sensor signals at fine increments of a crankshaft angle (e.g., 6 crankshaft degrees). Using an angle stamp for each MAP signal that is sent to a buffer circumvents the need to have a controller-interrupt at pre-specified angles because each sample does not need to be processed immediately. The processing may be carried out when the next cylinder firing event is about to take place (for example, every 240° on a three cylinder engine). Thus, accurate estimation of aircharge may be provided while minimizing the processing power required for estimating the aircharge.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 2:
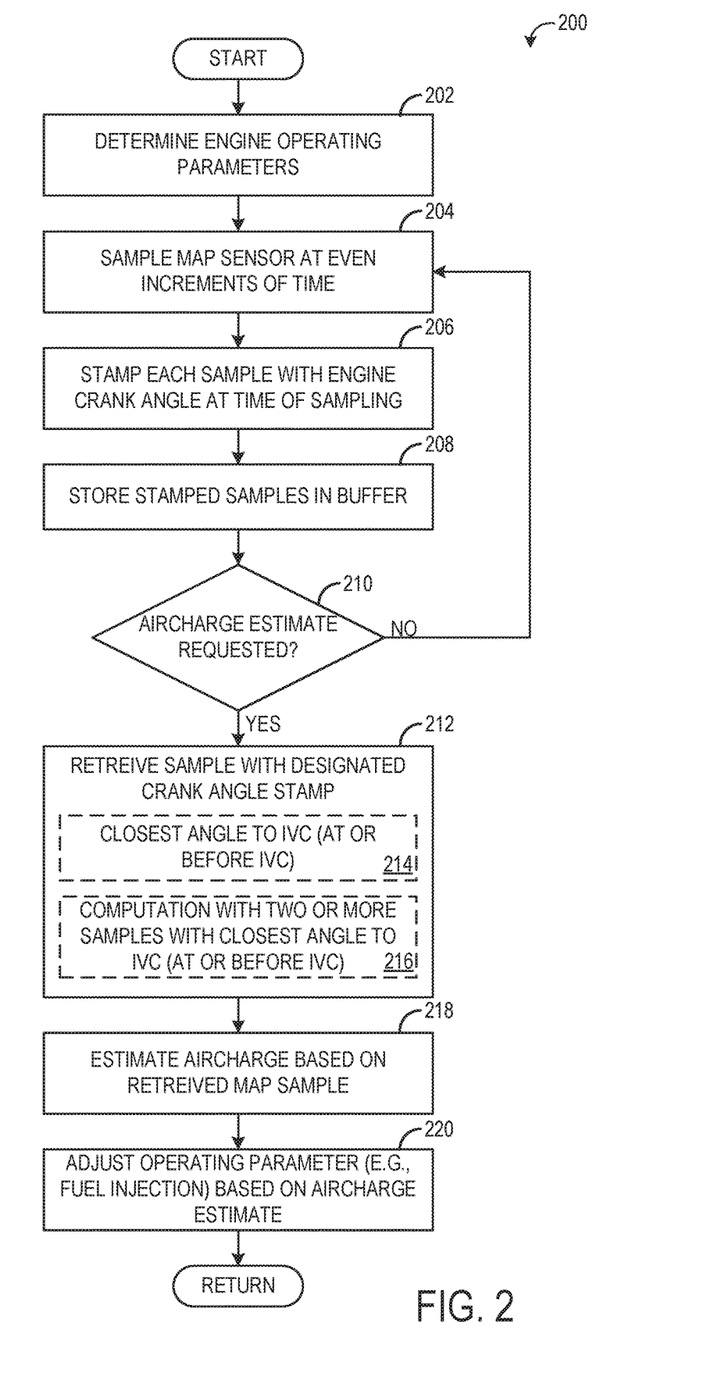
FIG. 2 shows a flow chart illustrating a method for determining aircharge into a cylinder and adjusting an engine operating parameter.
Figure 3:
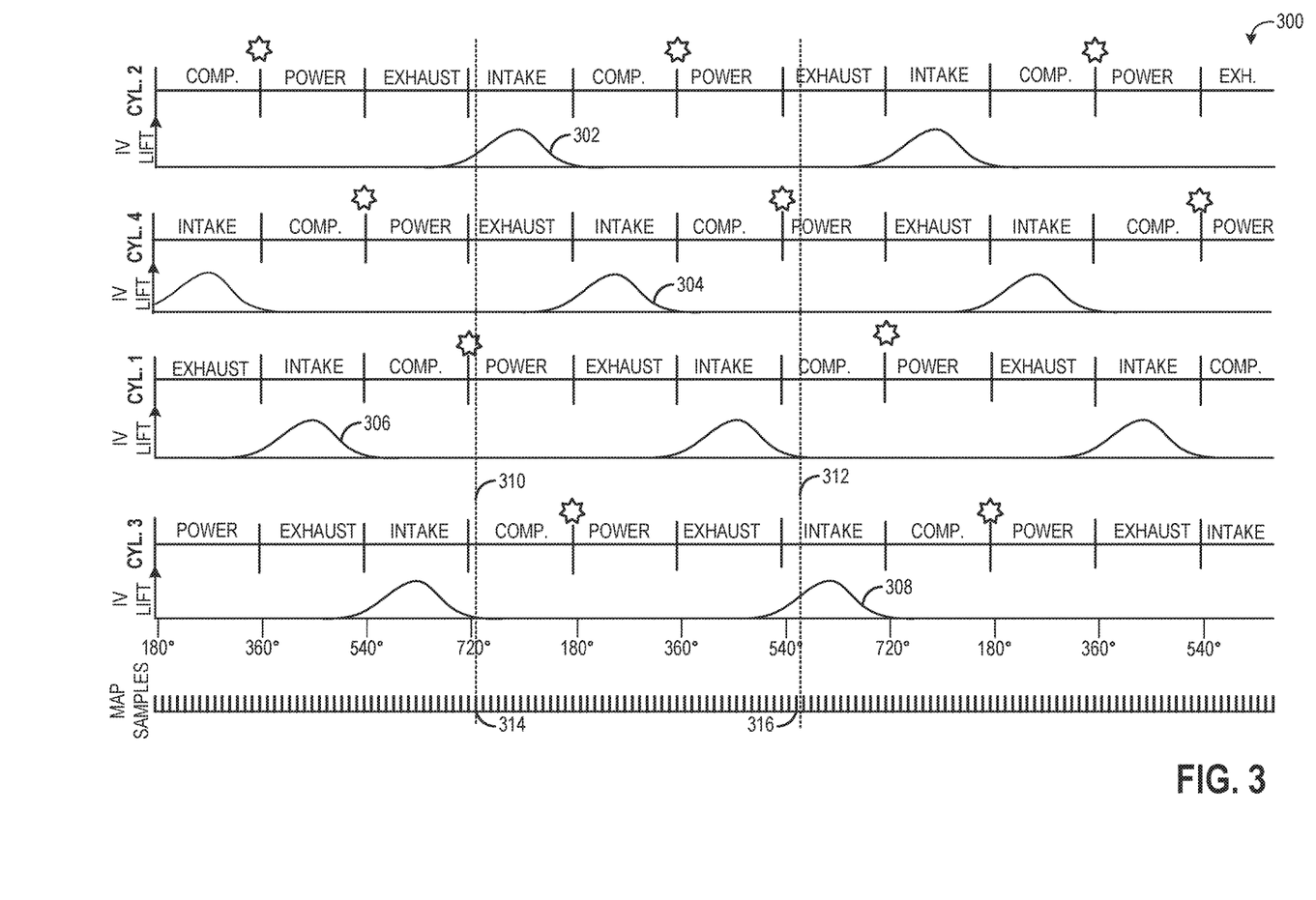
FIG. 3 shows ignition timing diagrams illustrating the intake valve lift of four individual cylinders, and their corresponding crankshaft angles and MAP sampling events.
Figure 4:
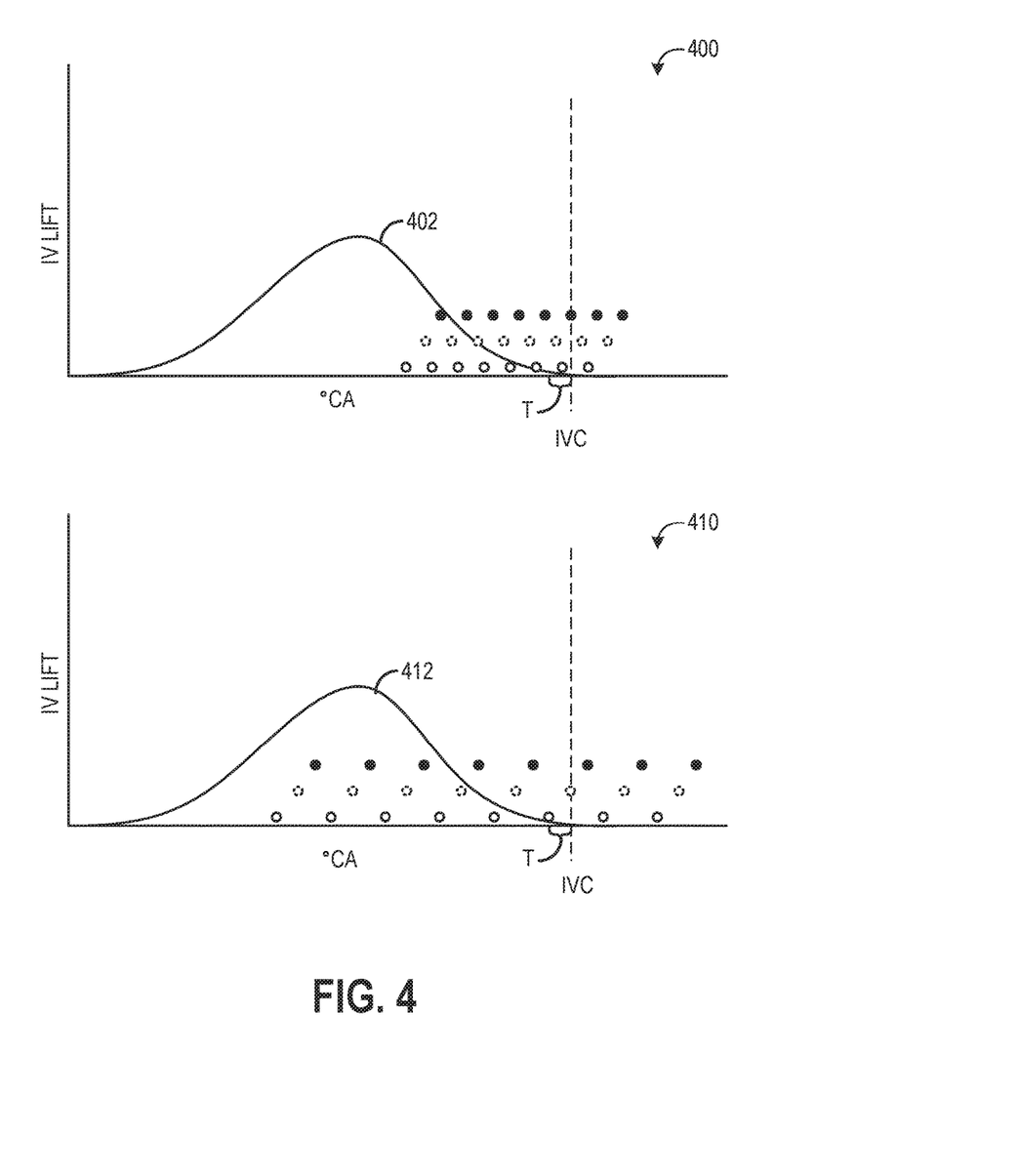
FIG. 4 shows intake valve lift for a cylinder at two engine speeds and their corresponding MAP sampling events in the vicinity of intake valve closing.

The present description is related to an efficient method for sampling an intake manifold absolute pressure (MAP) sensor at intake valve closing by sampling the sensor signal at even increments of time (e.g., 1 millisecond time increment) and angle-stamping the samples. These crankshaft angle-stamped MAP sensor signal samples may be accessed during engine operation for the purpose of determining an aircharge into a cylinder and subsequently adjusting operating parameters of said engine. Specifically, the sample having an angle stamp nearest to the engine crank angle at intake valve closing is retrieved and used to calculate aircharge. The sampling schedule of the MAP is pre-specified at even time intervals, and once each sample has been angle-stamped the information is stored in a buffer accessible to the controller. The engine system of FIG. 1 includes a MAP sensor that may be sampled at the selected time intervals or times during an engine cycle, as shown in FIG. 2, to provide information that may be the basis for determining various engine operating conditions. FIG. 3 shows example ignition events for four separate cylinders of an engine throughout several four-stroke cycles and their corresponding intake valve lifts. FIG. 3 depicts how the MAP sampling intervals correlate with the intake valve lift and the corresponding crankshaft angle within each four-stroke cycle. The gap between a sequence of MAP sensor samples and the moment of intake valve closing for a single cylinder at two engine speeds for three contiguous firing cycles is depicted in FIG. 4.

Figure 1:
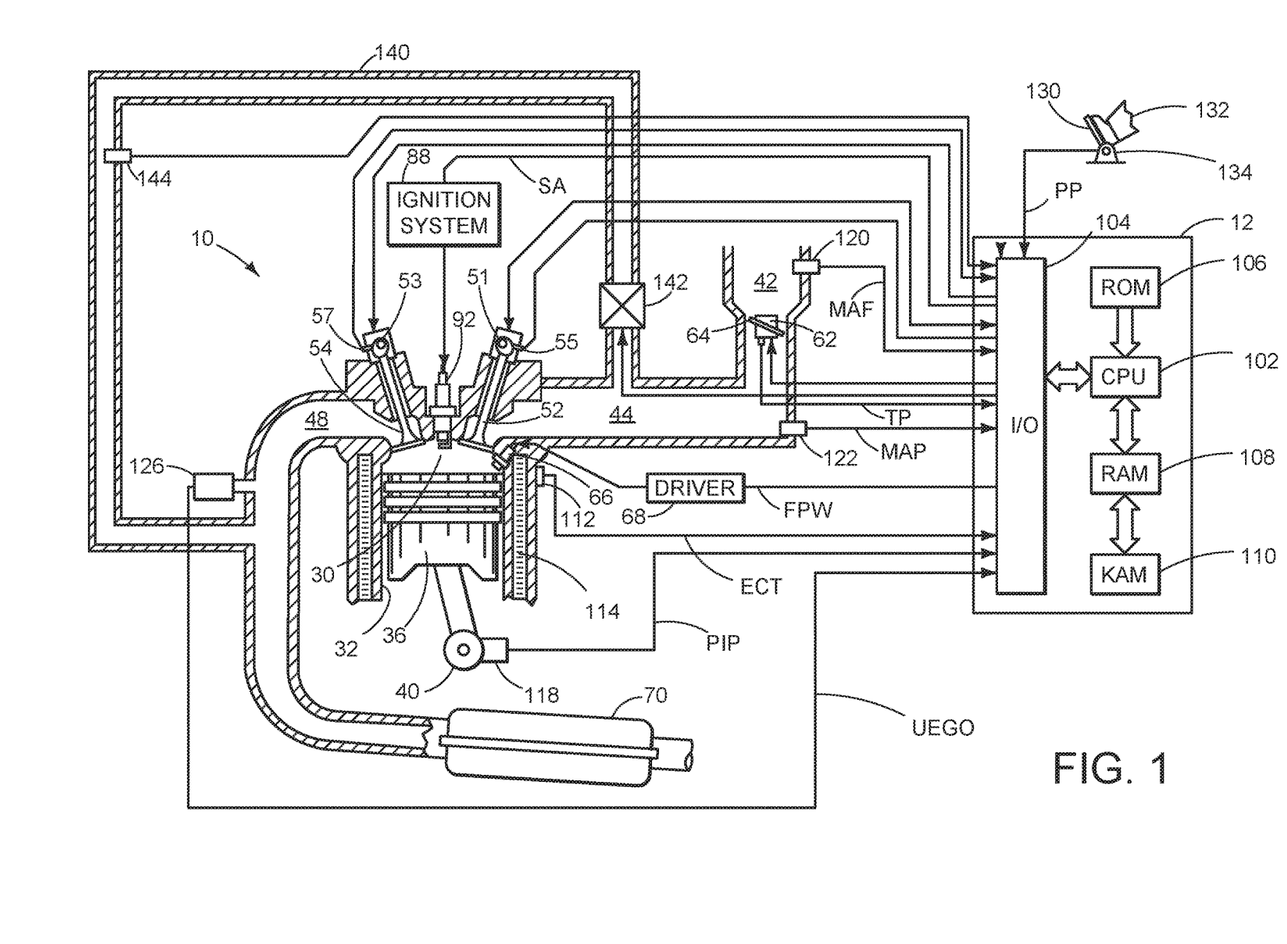
FIG. 1 shows a schematic diagram of a combustion chamber of an internal combustion engine.

FIG. 1 displays a schematic diagram showing one cylinder of multi-cylinder engine 10, which may be included in a propulsion system of a vehicle. Engine 10 may be controlled at least partially by a control system including controller 12 and by input from a vehicle operator 132 via an input device 130. In this example, input device 130 includes an accelerator pedal and a pedal position sensor 134 for generating a proportional pedal position signal PP. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 may selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown coupled directly to combustion chamber 30 for injecting fuel directly therein in proportion to the pulse width of signal FPW received from controller 12 via electronic driver 68. In this manner, fuel injector 66 provides what is known as direct injection of fuel into combustion chamber 30. The fuel injector may be mounted in the side of the combustion chamber or in the top of the combustion chamber, for example. Fuel may be delivered to fuel injector 66 by a fuel system (not shown) including a fuel tank, a fuel pump, and a fuel rail. In some embodiments, combustion chamber 30 may alternatively or additionally include a fuel injector arranged in intake passage 42 in a configuration that provides what is known as port injection of fuel into the intake port upstream of combustion chamber 30.

Intake passage 42 may include a throttle 62 having a throttle plate 64. In this particular example, the position of throttle plate 64 may be varied by controller 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 may provide an ignition spark to combustion chamber 30 via spark plug 92 in response to spark advance signal SA from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 10, emission control device 70 may be periodically reset by operating at least one cylinder of the engine within a particular air/fuel ratio.

Further, in the disclosed embodiments, an exhaust gas recirculation (EGR) system may route a desired portion of exhaust gas from exhaust passage 48 to intake manifold 44 via EGR passage 140. The amount of EGR provided to intake manifold 44 may be varied by controller 12 via EGR valve 142. Further, an EGR sensor 144 may be arranged within the EGR passage and may provide an indication of one or more pressure, temperature, and concentration of the exhaust gas. In some examples, sensor 144 is a differential pressure transducer detecting pressure drop across a flow control orifice placed either upstream or downstream of the EGR valve which will also provide an indication of the amount of EGR. Sensor 144 also may also be a position sensor which can detect EGR valve flow area changes based upon commands from controller 12. Further, during some conditions, a portion of combustion gases may be retained or trapped in the combustion chamber by controlling exhaust valve timing, such as by controlling a variable valve timing mechanism.

Controller 12 is shown in FIG. 1 as a microcomputer, including microprocessor unit 102, input/output ports 104, an electronic storage medium for executable programs and calibration values shown as read-only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used, such as a MAP sensor without a MAF sensor. In some embodiments multiple MAP sensors may be used, for example one per bank of cylinders or one per cylinder.

During stoichiometric operation, the MAP sensor can give an indication of engine torque. Further, this sensor, along with the detected engine speed, may provide an estimate of charge (including air) inducted into the cylinder. In one example, sensor 118, which is also used as an engine speed sensor, may produce a predetermined number of equally spaced pulses every revolution of the crankshaft. In another example, the MAP signals from sensor 122 may be stamped at controller 12 with the crankshaft angle determined from sensor 118 and stored in memory of the controller, or stored in a component operably (e.g., communicatively) coupled to the controller. These stored angle-stamped MAP signals may be used to estimate aircharge into a cylinder.

Storage medium read-only memory 106 may be programmed with computer readable data representing instructions executable by processor 102 for performing the method described below in FIG. 2 as well as other variants that are anticipated but not specifically listed. The controller 12 receives signals from the various sensors of FIG. 1 (such as MAP sensor 122) and employs the various actuators (such as fuel injector 66) of FIG. 1 to adjust engine operation based on the received signals and instructions stored on a memory of the controller.

As described above, FIG. 1 shows one cylinder of a multi-cylinder engine, and each cylinder may similarly include its own set of intake/exhaust valves, fuel injector, spark plug, etc. Further, the above-described aspects of the engine system are non-limiting, and other configurations are possible. For example, the system may not have exhaust air recirculation. In other examples, the system may further comprise a turbocharger supplying compressed air to the intake manifold.

During the operation of a multi-cylinder engine each cylinder undergoes a four-stroke cycle. The cycle includes an air intake stroke during which intake valve 52 is open and exhaust valve 54 is closed. Air is introduced into cylinder 30 via intake manifold 44, and piston 36 moves to the bottom of the cylinder so as to increase the volume within cylinder 30. The position at which piston 36 is near the bottom of the cylinder and at the end of its stroke (e.g., when cylinder 30 is at its largest volume) is typically referred to by those of skill in the art as bottom dead center (BDC). This is followed by a compression stroke, when both intake valve 52 and exhaust valve 54 are closed, and piston 36 moves toward the cylinder head so as to compress the air within cylinder 30. The point at which piston 36 is at the end of its stroke and closest to the cylinder head (e.g., when cylinder 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition devices such as spark plug 92, resulting in combustion. Additionally or alternatively compression may be used to ignite the air/fuel mixture. At the end of the compression stroke, the crankshaft has finished one full rotation in connection to this individual cylinder, i.e., it has traveled 360 degrees.

During the expansion (power) stroke that follows, the expanding gases energized by the combustion reaction push piston 36 back to BDC. Crankshaft 40 converts piston movement into a rotational torque of the rotary shaft. During this stroke valves 52 and 54 remain closed. The final stroke of the cycle is the exhaust stroke, where exhaust valve 54 opens to release the combusted air-fuel mixture to exhaust manifold 48 and the piston returns to TDC. This completes a second 360-degree movement, i.e., the crankshaft has finished a second full rotation in connection to this individual cylinder. Note that the above is described merely as an example, and that intake and exhaust valve opening and/or closing timings may vary, such as to provide positive or negative valve overlap, late intake valve closing, early intake valve closing, or various other examples.

As described above, the system may be able to determine a more accurate estimate of the aircharge for each cylinder at its intake valve closing (IVC) or at the closest sampling instance possible. When a sample of the manifold absolute pressure (MAP) sensor is taken at IVC, cylinder pressure may be relatively equal to MAP, since the intake valve was just closed after allowing pressure equalization between the intake manifold and the cylinder. Thus, by sampling MAP at IVC, an accurate estimate of cylinder aircharge may be obtained. The pressure may be combined with the volume of the cylinder to determine the cylinder trapped mass according to the ideal gas law pv=nRT, for example. Thus, sampling of MAP at or near IVC provides a more accurate pressure measurement of an amount of mass that is trapped in the cylinder at the start of the compression stroke. It is this mass of air that may be used to estimate the amount of fuel that may be injected into this cylinder.

While a particular cylinder is at a specific point within its four-stroke cycle, other cylinders are at a different point within their own individual cylinder cycle. In other words, they are out of phase. Thus while a particular cylinder may have just completed, for example, its compression stroke, a different cylinder will be starting its compression stroke at that same moment, e.g., it is 180 degrees out of phase with respect to the first cylinder, as depicted in FIG. 3.

If a particular cylinder has a crankshaft angle of 360 degrees at the start of its intake stroke, then IVC may occur at the end of this stroke, e.g., at 5400 degrees. The determination of air pressure by the MAP sensor at this exact time may be computationally expensive with standard mechanisms of sensor signaling, e.g., generating an interrupt. Sampling of MAP sensor 122 may be performed at selected increments of time. Therefore it is unlikely that MAP sensor sampling consistently takes place at IVC for each cylinder in a multi-cylinder engine. To collect a signal from the MAP sensor at IVC for each cylinder each engine cycle entails an interruption of the controller and the cooperation of controller resources to constantly monitor the occurrence of IVC. This approach may be impractical and/or expensive.

In principle, sampling of the MAP sensor at specific crankshaft angle increments may allow for the determination of MAP at IVC. These angles are measured by Hall effect sensor 118, which is coupled to crankshaft 40. However, sampling of sensors at increments of the crankshaft angle may be resource-intensive and/or may be prone to error during transient events, such as when engine speed and hence crankshaft speed is increasing. A robust way to control an engine may be through the capacity to both sample and process engine parameters at even increments of the crankshaft angle. However, since such an approach is resource-intensive, the current disclosure accomplishes a similar task by sampling first (e.g. 1 millisecond intervals) and processing later (e.g. 240° or 120° increments on a 3 cylinder engine).

By sampling the MAP sensor at even increments of time, for example every millisecond, stamping each sample with the concurrent angle of the crankshaft, placing these results in a data buffer accessible to the controller, and noting the present commanded (or actual) position of IVC, the controller may be able to handle and efficiently process the data. The aircharge may be computed based on a MAP sample, usually once per firing period (which is to say once per intake vale closing). Before calculating the aircharge prior to a fuel injection event, the controller may look through the angle stamps in the a buffer for the angle stamp, or set of stamps, closest to IVC and use the corresponding MAP data to compute the aircharge as described below with respect to FIG. 2. This aircharge may be used to compute the fuel injection amount. Once the fuel injection calculation has taken place, the buffer may be cleared to accept the next batch of angle-stamped MAP sensor readings in some examples. In other examples, the buffer may be a first in, first out buffer where each new sample replaces the oldest sample in the buffer. The capacity of this buffer may be based on a slowest engine speed at which the system is predicted to operate. The slower the speed of an engine, the more angle-stamped pressure signals have to be stored in the buffer. In one specific example, in order to support the above-described sampling and storing of MAP signal samples once every millisecond at a lowest engine speed of 450 RPM, the buffer may have a capacity of 267 samples (e.g., in order to store each sample collected during an engine cycle of two crankshaft revolutions). The buffer may be proportionally smaller if only a fraction of samples from the full engine cycle are needed. For example, if only the samples from one cylinder event are needed in a four cylinder engine, only 67 samples would be needed. Similarly, fewer samples may be needed when a slower sampling rate is used.

The above-described mechanism for calculating aircharge may be utilized in a direct-inject (DI) engine where fuel is typically injected after intake valve closing. However, calculating the aircharge using MAP at intake valve closing may also be beneficial in port fuel injected (PFI) engines, which inject fuel prior to intake valve closing. Estimate aircharge at intake valve closing may be used to compute the relative fuel-air ratio (also referred to as phi) of the intended fuel-air charge. This intended fuel-air charge may be compared to the actual fuel-air charge as determined from an exhaust gas sensor, such as the Universal Exhaust Gas Oxygen (UEGO) sensor. Future fueling corrections may be based on comparing the intended phi with the phi as inferred from the UEGO sensor. As explained above, a DI engine typically injects a portion of its fuel after intake valve closing. Thus, the fuel injection pulses after intake valve closing can adjust phi with a high accuracy air charge measurement made at or near intake valve closing.

FIG. 2 illustrates a method 200 for determining aircharge into a cylinder and adjusting an engine operating parameter based on a previous determination of the closest MAP measurement prior to IVC. Method 200 may be carried out by instructions stored in the memory of a controller, such as controller 12 and in conjunction with signals received from sensors of the engine system, such as the sensors (e.g., MAP sensor 122) described above with reference to FIG. 1. The controller may employ engine actuators of the engine system (e.g., fuel injector 66) to adjust engine operation, according to the methods described below.

Method 200 includes, at 202, determining engine operating parameters including engine speed and load, barometric pressure, MAP and MAF, engine and/or manifold temperature, driver requested torque, etc. At 204, MAP sensor output is sampled at even increments of time as depicted in FIG. 3. In one embodiment the MAP sensor sampling rate may be specified as one sensor reading every millisecond. In another embodiment the sampling rate maybe at five-millisecond intervals, while in other embodiments the sampling rate may be different or made to be adjustable within a specified range of sampling frequencies.

At 206, method 200 includes stamping each sample with the engine crank angle at the time of sampling. The crankshaft angle may be measured by a Hall effect sensor (such as sensor 118). The value of the angle is used to stamp the signal from the MAP sensor. The connection between MAP sampling instances and the concurrent determination of the corresponding crankshaft angle is depicted in FIG. 3, which will explained in more detail below. This sampling of MAP signals and their immediate stamping with their concurrent crank angles takes place as long as the engine is operating in some examples. Note that while the MAP sensor sampling takes place at even time intervals, the rate at which the crank angles are detected depends on the speed of an engine. When an engine is operating at a higher speed the rotation speed of the crankshaft is also higher. The key period for the determination of MAP is within the air intake stroke, in particular at or near its end, when IVC takes place. Intake valve closing generally occurs within the compression stroke which is a 180-degree window within the entire 720-degree expanse of the four-stroke cycle. The faster the rotation of an engine, the faster these 180 degrees are traveled by the crankshaft. Thus, at faster engine speeds the likelihood that a measured and angle-stamped MAP signal is exactly or in the immediate vicinity of IVC is lower. Conversely, for an engine operating slower speeds this likelihood is higher. These dynamics are depicted in FIG. 4 for one cylinder of an engine operating at two different engine speeds.

In some examples, an alternative approach for determining the crank angle when a MAP sample is taken is to infer the crank angle based on the crank angle of the current interrupt and knowledge of the present engine angular velocity (e.g., engine speed). Effectively, this is a way to assign approximate crank angles to the MAP samples instead of using the higher accuracy angle data that originate from engine position sensing/extrapolation.

At 208, the angle-stamped MAP signals are stored in a buffer. This buffer may be within memory of the controller, or in a component operably (e.g., communicatively) coupled to it. The number of angle-stamped samples that may be stored in this buffer depends on the speed of the engine. As noted above, the faster the speed of an engine is, the faster the 180 degrees corresponding to the intake stroke will be traversed at the crankshaft. Since the MAP signals are sampled at pre-determined even increments of time, a fast engine will produce fewer angle-stamped MAP signals than a slow engine during the same 180-degree crankshaft angle displacement. Thus, buffer capacity may be dictated by the lowest boundary of the speed range of an engine during engine operation, or by the lowest speed at which it is desired to support the sampling described herein. The maximum number of angle-stamped MAP signals that may be stored at a buffer may correspond to this lowest engine speed.

Data stored in a buffer may follow one or more buffer-clearing protocols. In one embodiment, information pertaining to new angle-stamped signals will enter a buffer at the beginning of the buffer queue, displacing the oldest stored signal at the end of the queue. In another embodiment, the whole buffer may be cleared at the end of the firing sequence. In other embodiments, older angle-stamped MAP sensor signals from two or more previous firing strokes may be stored within memory of controller 12, to produce a more accurate estimate of IVC. Note that in this example the use of one buffer is described, but that in other embodiments each operating cylinder may be allocated its own buffer.

At 210, method 200 determines if an aircharge estimate is requested. If no aircharge is requested method 200 proceeds to 204 to continue the sampling of MAP signals, followed by their angle-stamping and subsequent storage in a buffer, as described at 204, 206, and 208, respectively. If at 210 it is determined that an aircharge has been requested, method 200 proceeds to initiate the processing of the pertinent signals at 212.

At 212, method 200 includes retrieving one or more samples having a designated crank angle stamp. For example, the controller may search through the buffer and determine the angle-stamped MAP signal(s) that match a designated crank angle, such as a crank angle that coincides with IVC. For engines with variable camshaft timing, cam profile switching, or other forms of variable valve timing, the controller determines IVC based upon the current state or position of the variable valve timing actuator. Once selected, the MAP sample may be used at 218 to estimate the aircharge. However, as noted in the discussion for 206 above, the likelihood that a MAP sensor reading will coincide with IVC depends on the speed of an engine. Therefore in some examples IVC may not precisely coincide with any of the MAP sensor readings, as determined from their angle stamps. In such a case an option that may produce a more accurate estimate is to choose the MAP reading which is closest to IVC, before IVC takes place. At 214, method 200 retrieves, for further processing, the closest angle-stamped MAP reading that takes place before IVC. In other embodiments, at 216, method 200 determines the closest to IVC MAP signal as the average of two or more of the closest MAP signals before IVC, as determined from their corresponding angle stamps. Other embodiments may use an extrapolation of two or more angle-stamped MAP signals closest and prior to IVC that are stored in the a buffer, or an interpolation based on buffer-stored angle-stamped signals closest to IVC that include signals collected immediately before and after IVC. In addition, other embodiments may use angle-stamped signals collected in two or more previous firing rounds of a particular cylinder in conjunction with the current angle-stamped MAP values determined at 214 to refine the determination of said cylinder's MAP at IVC for the purpose of aircharge estimation.

At 218, the aircharge is estimated using the MAP value determined at 212. The aircharge may be estimated using the manifold pressure value estimated at 212 by combining with the volume of the cylinder to determine the cylinder trapped mass according to the ideal gas law pV=nRT. Alternatively, tables correlating MAP to cylinder aircharge or other suitable methods may be used to estimate aircharge based on a known MAP value. Once the aircharge has been computed, method 200 at 220 adjusts a selected engine operating parameter. This operating engine parameter may be the amount of fuel to be injected into the cylinder chamber, for example for the purpose of attaining a stoichiometric fuel to air ratio in the combustion chamber. However, other engine operating parameters may also be adjusted, such as EGR valve position, intake and/or exhaust valve timing, boost pressure, or other suitable parameter.

When the operating engine parameter is the amount of fuel to be injected into the cylinder chamber to achieve a desired torque while operating the air/fuel combusted in the cylinder at stoichiometry, the mass of air and recirculated exhaust gas entering the cylinder is first calculated using the speed density algorithm described above. The mass of recirculated gas is then calculated from a pressure difference across EGR valve 142 and subtracted from the air and exhaust gas entering the cylinder to provide the mass of fresh air entering the cylinder. The desired fuel is then calculated to achieve stoichiometry in the cylinder and the desired fuel is delivered by activating the fuel injector for a time required to deliver this fuel considering fuel temperature and pressure. The required activation time is provided by the pulse width of the electrical signal driving the fuel injector. Method 200 then returns.

Operation of engine 10, particularly, the firing order, will be described now in reference to FIG. 3, which depicts ignition timing diagrams 300 for the four cylinders of engine 10. For each diagram, cylinder number is shown on the y-axis and engine strokes are depicted on the x-axis. Further, ignition, and the corresponding combustion event, within each cylinder is represented by a star symbol between compression and power strokes within the cylinder. Engine 10 may be fired with the following firing order: 1-3-2-4 (or 2-4-1-3 or 3-2-4-1 or 4-1-3-2 since the firing is cyclic) at even intervals, e.g., one cylinder may be fired every 180° crank angle. The x-axis of each cylinder's ignition timing diagram is relative to engine crankshaft angles, depicted as the second from the bottom plot of FIG. 3, with the onset of CYL. 3's power stroke set as 0 degrees. Since all four cylinders are out of phase with respect to each other, an angle value of 0 corresponds to the onset of the compression cycle for CYL. 2, the intake cycle for CYL. 4 and the exhaust cycle for CYL. 1, respectively. Below the diagram for CYL. 3, there is an additional diagram depicting the sampling of MAP signals at even time increments. The collection schedule of these MAP samples takes place consistently, for example once every millisecond. The pressure that sensor 122 detects at the manifold applies the same to all four cylinders.

The first stroke depicted in FIG. 3, starting at a crankshaft angle of 180 degrees, displays CYL. 2 traversing its compression stroke, at the end of which ignition takes place, as indicated by the star symbol. Concurrently, CYL. 4, CYL. 1, and CYL. 3 are traversing their intake, exhaust, and power strokes, respectively. This whole sequence is repeated as each cylinder progresses to the right in FIG. 3, toward the next appropriate stroke within its four-stroke cycle. The intake valve lifts for CYLS. 2, 4, 1, and 3 are highlighted at 302, 304, 306, and 308, respectively, illustrating the opening of the respective intake valves at each intake stroke.

310 indicates the crank angle at which IVC takes place for CYL. 3. This event coincides with the sampling of MAP at 314. The angle at 310 has been used to stamp the MAP sample at 314, as described in method 200 at 206, and thus the MAP sample 314 is used to calculate aircharge, as described at 218 and 220 of method 200. In contrast, the end of the intake stroke at CYL. 1, e.g., at IVC 312, there is no MAP sample that coincides exactly with IVC, and the closest MAP sample before IVC is at sample 316. In this example, sample 316 may be used to calculate aircharge. As described above with respect to method 200, the closest MAP sample before IVC may be identified and used to calculate aircharge. Other embodiments may use MAP values sampled at 316 and those immediately preceding it to determine the best value of MAP, for example as described at 216 of method 200.

As the speed of an engine varies, the 180-degree portion of the crankshaft rotation that pertains to the compression stroke may comprise variable amounts of time, for example when engine speed is low the compression stroke may have a longer duration of time than when engine speed is high. This is exemplified in FIG. 4 by contrasting the MAP sample collection immediately prior to IVC for a single cylinder at two different engine speeds. FIG. 4 illustrates a first diagram 400 of valve lift and MAP sampling at a first, lower engine speed, and also illustrates a second diagram 410 of valve lift and MAP sampling at a second, higher engine speed.

As the lift of an intake valve goes through its cycle (e.g., opens and closes), the end of this cycle (when the intake valve closes) is termed IVC. The rate of opening and closing of an intake valve is then proportional to the speed of an engine. In diagram 400, the engine is operating at a slow speed, while in diagram 410 the engine is operating at a fast speed. In both cases three separate sets of MAP samples are illustrated in the three rows of circles representing MAP sampling sequences in the vicinity of IVC. The solid circles represent the sampling events for the current firing cycle, while the dashed circles and the open circles represent the MAP sampling events for the two previous firing cycles. It is to be understood that the MAP samples are provided for illustrative purposes only and are depicted in three separate rows for clarity and purpose of comparison between the three sets of samples. Note how at either engine speed most of the MAP sampling sequences are such that MAP sampling does not coincide with IVC. In other words, the gap between IVC and the closest MAP sampling instance is variable. Further, the angular distance between sampling events in diagram 400, for slow engine speeds, is shorter than the corresponding sequence in diagram 410, for fast engine speeds. As discussed earlier, the fact that more MAP sampling events take place at slow engine speeds impacts the capacity of the buffer at 208. The minimum capacity of the buffer may be dictated by the slowest speed at which an engine is likely to operate.

The rate at which an intake valve goes through its opening and closing cycle is also dependent on the speed of an engine. The intake valve lift for the air intake stroke at slow engine speed (e.g., 500 RPM) is illustrated by curve 402. The sweep of this valve event (e.g., from opening to closing) takes place at a slower rate than the corresponding sweep of an intake valve event at faster engine speeds (e.g., 2000 RPM), as shown by curve 412. Consequently, for MAP signals sampled at even time intervals, the sampling sequence is denser for slower engine speeds than for faster engine speeds, as depicted by the two groups of circles at 400 and 410, respectively. Because the engine at 400 has a denser sampling sequence, it is more likely to include a MAP sample that is a closer approximation to MAP conditions at IVC than when the engine has the less-dense sampling sequence at 410. For example, for all three sets of MAP samples illustrated in diagram 400 have a MAP sample that occurs at or within a threshold (T) crank angle of IVC.

As described above, with respect to method 200 the angle-stamped MAP signal stored in the buffer that either coincides with IVC or which is closest prior to IVC is selected to calculate aircharge. The gap between MAP sampling instances of MAP readings in diagram 400, as depicted for three contiguous intake cycles, suggests that the likely gap between IVC and the closest MAP sampling prior to IVC is smaller than the corresponding gaps for faster engine speeds depicted in diagram 410. For example, one set of three sets of MAP samples illustrated in diagram 410 has a MAP sample that occurs outside the threshold (T) crank angle of IVC. This sample may generate a less accurate aircharge estimation than samples that fall within the threshold.

Thus a MAP signal sampled at slow engine speeds may produce a closer approximation to MAP conditions at IVC compared to a MAP signal sampled at faster engine speeds. The gap between MAP samples for the faster engine at 410 is wider, and it is more likely that this gap is also wider between the closest MAP sample prior to IVC and IVC. Therefore, in some examples, the calculation of aircharge based on MAP may be adjusted at higher engine speeds. For example, at high engine speeds, the MAP at IVC may be estimated based on a MAP reading for a previous engine cycle, the MAP at IVC may be estimated based on two or more MAP samples before and/or after IVC, or other suitable mechanism for estimating MAP at IVC.

Accurate determination of manifold air pressure at intake valve closing contributes in turn to a more accurate estimation of an aircharge into a cylinder. An aircharge estimated this way contributes to a more efficient adjustment of an engine's operating parameters, such as the amount of fuel injection into a cylinder. The disclosed method samples MAP signals at even time intervals, stamps these signals with the concurrent angle of the crankshaft, and stores these signals in a buffer. The method further, when an aircharge is requested by an engine's system, searches the buffer in order to identify the MAP sample that is closest to IVC. The identified (or computed) MAP value may be used to estimate an aircharge into a cylinder with the purpose of adjusting an engine operating parameter, for example the amount of fuel injection into a cylinder.

The technical effect of determining an aircharge by retrieving from a buffer an angle-stamped MAP signal (or a plurality of signals) is to estimate the value of MAP which is closest to IVC in order to adjust operating engine parameters.

A method is provided comprising sampling an intake manifold pressure sensor signal at even increments of time, storing each sampled signal in a buffer, processing the stored sampled signals in the buffer at even increments of engine crank angle, and adjusting an engine operating parameter based on a sample selected from all the processed sampled signals. A first example of the method includes wherein adjusting an engine operating parameter based on a selected one of the processed sampled signals comprises adjusting a fuel injection amount based on a selected one of the processed sampled signals. A second example of the method optionally includes the first example and further includes wherein processing the stored sampled signals in the buffer at even increments of engine crank angle comprises processing the stored sampled signals at an engine firing frequency. A third example of the method optionally includes one or both of the first and second examples and further includes, prior to storing each sampled signal in the buffer, stamping each sampled signal with an engine crank angle stamp that corresponds an engine crank angle at a time the sampled signal was sampled. A fourth example of the method optionally includes one or more or each of the first through third examples and further includes wherein the processing of the stored sampled signals in the buffer at even increments of engine crank angle comprises selecting a sampled signal from the buffer having an engine crank angle stamp that corresponds to an engine crank angle at or before a designated engine crank angle, processing the selected sampled signal to determine intake manifold pressure, and adjusting the fuel injection amount based on an aircharge estimation calculated based on the determined intake manifold pressure. A fifth example of the method optionally includes one or more or each of the first through fourth examples and further includes wherein the designated engine crank angle comprises an engine crank angle at intake valve closing for a given cylinder of an engine, and further comprises injecting fuel at the adjusted fuel injection amount to the given cylinder. A sixth example of the method optionally includes one or more or each of the first through fifth examples and further includes wherein selecting the sampled signal from the buffer having the engine crank angle stamp that corresponds to the engine crank angle at or before intake valve closing comprises selecting a sampled signal from the buffer having an engine crank angle stamp closest to the engine crank angle at intake valve closing relative to all other samples in the buffer.

An embodiment of a method includes sampling an intake manifold pressure sensor signal at predetermined time intervals to generate a data set including a plurality of samples, stamping each sample of the data set with an engine crank angle, and in response to a fuel injection request, adjusting fuel injection based on an intake aircharge amount estimated based on a selected sample of the data set, the selected sample having an engine crank angle stamp at or before a designated engine crank angle. In a first example of the method, the selected sample has a crank angle stamp that is closest to the designated engine crank angle relative to all other samples in the data set. A second example of the method optionally includes the first example and further includes wherein the fuel injection request comprises a fuel injection request for a given cylinder of the engine and wherein the selected sample has an engine crank angle stamp at or before an engine crank angle corresponding to an intake valve closing event for the given cylinder. A third example of the method optionally includes one or both of the first and second examples and further includes wherein stamping each sample of the data set with an engine crank angle comprises, for a given sample, retrieving a crank angle of the engine at a point in time when the given sample was sampled and stamping the given sample with the retrieved crank angle. A fourth example of the method optionally includes one or more or each of the first through third examples and further includes storing the data set in a buffer of a memory of a controller operably coupled to the intake manifold pressure sensor. A fifth example of the method optionally includes one or more or each of the first through fourth examples and further includes, after adjusting the fuel injection based on the intake aircharge amount estimated based on the selected sample, discarding remaining samples of the data set from the buffer.

A system comprises an engine having a plurality of cylinders supplied with intake air from an intake manifold, a manifold pressure sensor coupled to the intake manifold, and a controller storing instructions that when executed may cause the controller to sample a signal from the manifold pressure sensor at predetermined sampling rate. The controller stores further instructions that when executed cause the controller to, for each sample, stamp the sample with a corresponding engine crank angle, store each stamped sample in a buffer, in response to a request to inject fuel to a cylinder of the plurality of cylinders, retrieve a sample from the buffer having a crank angle stamp corresponding to an engine crank angle near an intake valve closing event of the cylinder, and adjust a fuel injection amount based on an aircharge estimate, the aircharge estimate determined based on the retrieved sample. In a first example of the system, the retrieved sample has a crank angle stamp that is closest to the engine crank angle at the intake valve closing event relative to all other samples in the buffer. A second example of the system optionally includes the first example and further includes wherein the retrieved sample has a crank angle stamp that is earlier than the engine crank angle at the intake valve closing event. A third example of the method optionally includes one or both of the first and second examples and further includes wherein the retrieved sample has a crank angle stamp that corresponds to a last engine crank angle before the intake valve closing event. A fourth example of the method optionally includes one or more or each of the first through third examples and further includes wherein the retrieved sample is a first sample having a crank angle stamp that is closest to the engine crank angle at the intake valve closing event relative to all other samples in the buffer, and wherein the controller includes further instructions that when executed cause the controller to retrieve a second sample from the buffer having a second crank angle stamp before or after the first sample, and adjust the fuel injection amount based on the aircharge estimate, the aircharge estimate determined based on the retrieved first sample and second sample. A fifth example of the method optionally includes one or more or each of the first through fourth examples and further includes wherein the engine is a direct-inject engine, and wherein the adjusting of the fuel injection amount is for a fuel injection event occurring in a current engine cycle. A sixth example of the method optionally includes one or more or each of the first through fifth examples and further includes wherein the engine is a port fuel injection engine, and wherein the adjusting of the fuel injection amount is for a fuel injection event occurring in a subsequent engine cycle.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method, comprising:
sampling an intake manifold pressure sensor signal at pre-specified, even increments of time, wherein the pre-specified, even increments of time are independent of an engine speed;
stamping the sampled signal with an engine crank angle stamp that corresponds to an engine crank angle at a time the sampled signal was sampled;
after the stamping, storing each stamped sampled signal in a buffer, wherein a capacity of the buffer is based on the engine speed;
processing the stored sampled signals in the buffer at even increments of engine crank angle based on the engine crank angle stamp; and
adjusting an engine operating parameter based on a selected one of the processed sampled signals.

2. The method of claim 1, wherein adjusting the engine operating parameter based on the selected one of the processed sampled signals comprises adjusting a fuel injection amount based on the selected one of the processed sampled signals.

3. The method of claim 1, wherein processing the stored sampled signals in the buffer at even increments of engine crank angle based on the engine crank angle stamp comprises processing the stored sampled signals at an engine firing frequency.

4. The method of claim 2, wherein the method is for an engine comprising a plurality of cylinders, each of the cylinders associated with at least one of a plurality of pressure sensors, and wherein sampling the intake manifold pressure sensor signal at pre-specified, even increments of time comprises sampling one or more pressure sensor signals of the at least one of the plurality of pressure sensors associated with each of the cylinders at the pre-specified, even increments of time.

5. The method of claim 4, wherein processing the stored sampled signals in the buffer at even increments of engine crank angle based on the engine crank angle stamp comprises:
selecting a sampled signal from the buffer having an engine crank angle stamp that corresponds to an engine crank angle at or before a designated engine crank angle; and
processing the selected sampled signal to determine an intake manifold pressure;
wherein adjusting the fuel injection amount comprises adjusting the fuel injection amount based on an aircharge estimation calculated based on the determined intake manifold pressure.

6. The method of claim 5, wherein the designated engine crank angle comprises an engine crank angle at intake valve closing for a given cylinder of the engine, and further comprising injecting fuel at the adjusted fuel injection amount to the given cylinder.

7. The method of claim 6, wherein selecting a sampled signal from the buffer having the engine crank angle stamp that corresponds to an engine crank angle at or before intake valve closing comprises selecting a sampled signal from the buffer having an engine crank angle stamp closest to the engine crank angle at intake valve closing, relative to all other samples in the buffer.

8. A method for an engine, comprising:
sampling an intake manifold pressure sensor signal at predetermined time intervals to generate a data set including a plurality of samples, wherein the data set is stored within a buffer, wherein a capacity of the buffer is determined based on an engine speed, and wherein the predetermined time intervals are independent of the engine speed;
stamping each sample of the data set with an engine crank angle; and
in response to a fuel injection request, adjusting fuel injection based on an intake aircharge amount estimated based on a selected sample of the data set, the selected sample having an engine crank angle stamp at or before a designated engine crank angle.

9. The method of claim 8, wherein the selected sample has an engine crank angle stamp that is closest to the designated engine crank angle relative to all other samples in the data set.

10. The method of claim 8, wherein the fuel injection request comprises a fuel injection request for a given cylinder of the engine, and wherein the selected sample has an engine crank angle stamp at or before an engine crank angle corresponding to an intake valve closing event for the given cylinder.

11. The method of claim 8, wherein stamping each sample of the data set with an engine crank angle comprises, for a given sample, retrieving a crank angle of the engine at a point in time when the given sample was sampled and stamping the given sample with the retrieved crank angle of the engine.

12. The method of claim 8, further comprising storing the data set in a buffer of a memory of a controller operably coupled to an intake manifold pressure sensor.

13. The method of claim 12, further comprising, after adjusting the fuel injection based on the intake aircharge amount estimated based on the selected sample, discarding remaining samples of the data set from the buffer.

14. A system, comprising:
an engine having a plurality of cylinders supplied with intake air from an intake manifold;
a manifold pressure sensor coupled to the intake manifold; and
a controller storing instructions that, when executed, cause the controller to:
sample a signal from the manifold pressure sensor at a predetermined sampling rate, wherein the predetermined sampling rate is independent of an engine speed;
for each sample, stamp the sample with a corresponding engine crank angle;
store each stamped sample in a buffer, wherein a capacity of the buffer is determined based on the engine speed;
responsive to a request to inject fuel to a cylinder of the plurality of cylinders, retrieve a sample from the buffer having a crank angle stamp corresponding to an engine crank angle near an intake valve closing event of the cylinder; and
adjust a fuel injection amount based on an aircharge estimate, the aircharge estimate determined based on the retrieved sample.

15. The system of claim 14, wherein the retrieved sample has a crank angle stamp that is closest to the engine crank angle at the intake valve closing event relative to all other samples in the buffer.

16. The system of claim 15, wherein the retrieved sample has a crank angle stamp that is earlier than the engine crank angle at the intake valve closing event.

17. The system of claim 14, wherein the retrieved sample has a crank angle stamp that corresponds to a last engine crank angle before the intake valve closing event.

18. The system of claim 14, wherein the retrieved sample is a first sample having a crank angle stamp that is closest to the engine crank angle at the intake valve closing event relative to all other samples in the buffer, and wherein the controller includes further instructions that, when executed, cause the controller to:
  when engine speed is greater than a threshold engine speed, responsive to the request to inject fuel to the cylinder of the plurality of cylinders, retrieve a second sample from the buffer having a second crank angle stamp before or after the first sample; and
  adjust the fuel injection amount based on the aircharge estimate, the aircharge estimate determined based on the retrieved first and second samples.

19. The system of claim 14, wherein the engine is a direct-inject engine, and wherein the adjusting of the fuel injection amount is for a fuel injection event occurring in a current engine cycle.

20. The system of claim 14, wherein the engine is a port fuel injection engine, and wherein the adjusting of the fuel injection amount is for a fuel injection event occurring in a subsequent engine cycle.

* * * * *